United States Patent
Kim et al.

(10) Patent No.: US 8,692,853 B2
(45) Date of Patent: Apr. 8, 2014

(54) MOBILE TERMINAL AND METHOD FOR CONTROLLING 3 DIMENSION DISPLAY THEREOF

(75) Inventors: Jonghwan Kim, Incheon (KR); Jaehwa Yu, Incheon (KR)

(73) Assignee: LG Electronics Inc., Seoul (KR)

( * ) Notice: Subject to any disclaimer, the term of this patent is extended or adjusted under 35 U.S.C. 154(b) by 476 days.

(21) Appl. No.: 13/049,373

(22) Filed: Mar. 16, 2011

(65) Prior Publication Data

US 2012/0050262 A1   Mar. 1, 2012

(30) Foreign Application Priority Data

Sep. 1, 2010  (KR) .................. 10-2010-0085517

(51) Int. Cl.
*G09G 5/00* (2006.01)
(52) U.S. Cl.
USPC .......................................... 345/679; 345/629
(58) Field of Classification Search
USPC ................................................ 345/679, 629
See application file for complete search history.

(56) References Cited

U.S. PATENT DOCUMENTS

| | | | |
|---|---|---|---|
| 6,243,054 | B1 | 6/2001 | DeLuca |
| 6,559,813 | B1 | 5/2003 | DeLuca et al. |
| 2004/0100479 | A1 | 5/2004 | Nakano et al. |
| 2007/0195082 | A1 | 8/2007 | Takanashi et al. |

FOREIGN PATENT DOCUMENTS

| | | |
|---|---|---|
| CN | 1458565 A | 11/2003 |
| CN | 101013507 A | 8/2007 |
| EP | 0717346 A2 | 6/1996 |

*Primary Examiner* — Maurice L McDowell, Jr.
(74) *Attorney, Agent, or Firm* — Birch, Stewart, Kolasch & Birch, LLP

(57) ABSTRACT

A mobile terminal including a display unit configured to display at least a first 3D object at a first 3D depth level and a second 3D object at a second 3D depth level that is different than the first 3D depth level; and a controller configured to receive a first selection action on the first 3D object and a second selection action on the second 3D object image, to convert the second 3D depth level of the second 3D object to match the first 3D depth level of the first 3D object based on the first and second selection actions, and to control the display unit to display the first and second 3D objects at the first 3D depth level.

20 Claims, 14 Drawing Sheets

MOBILE TERMINAL AND METHOD FOR CONTROLLING 3 DIMENSION DISPLAY THEREOF

Pursuant to 35 U.S.C. §119(a), this application claims the benefit of the Korean Patent Application No. 10-2010-0085517, filed on Sep. 1, 2010, which is hereby incorporated by reference as if fully set forth herein.

BACKGROUND OF THE INVENTION

1. Field of the Invention

The present invention relates to a mobile terminal that can control display of a plurality of three-dimensional object images and a method for controlling three-dimension display thereof.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

SUMMARY OF THE INVENTION

Accordingly, the present invention is directed to a mobile terminal and a method for controlling a three-dimension display thereof, which substantially obviate ones or more problems due to limitations and disadvantages of the related art.

An object of the present invention is to provide a mobile terminal that can change a three-dimension display level of an object image based on another object image in a state that a plurality of object images are displayed, and a method for controlling three-dimension display thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention comprises a user input unit inputting a first selection action of a first object image and a second selection action of a second object image; a controller selecting the first object image as a reference object image and the second object image as a conversion object image as the first and second selection actions are input, and converting a three-dimension display level of the second object image to be identical with that of the first object image; and a display unit three-dimensionally displaying the first and second object images at the same three-dimension display level in accordance with the result of the converting step performed by the controller.

In another aspect, a method for controlling a three-dimension display of a mobile terminal comprises the steps of selecting a first object image as a reference object image as a first selection action of the first object image is input; selecting a second object image as a conversion object image as a second selection action of the second object image is input; converting a three-dimension display level of the second object image to be identical with that of the first object image; and three-dimensionally displaying the first and second object images at the same three-dimension display level in accordance with the result of the converting step.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Reference will now be made in detail to the preferred embodiments of the present invention, examples of which are illustrated in the accompanying drawings. Wherever possible, the same reference numbers will be used throughout the drawings to refer to the same or like parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
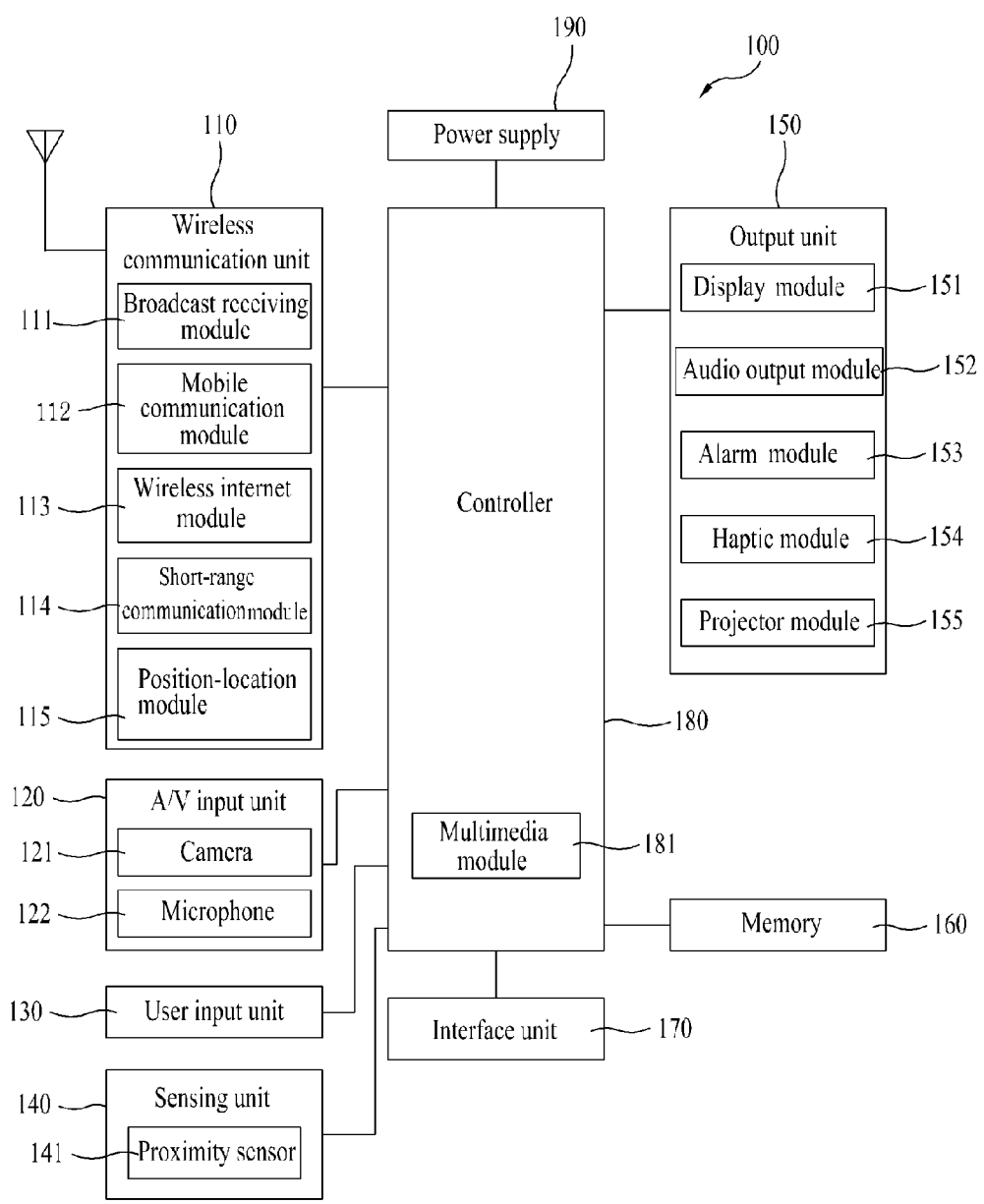
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-information module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-information module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can he stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Interconnected operational mechanism between the display unit 151 and the touchpad (not shown) is explained with reference to FIG. 2 as follows.

Figure 2:
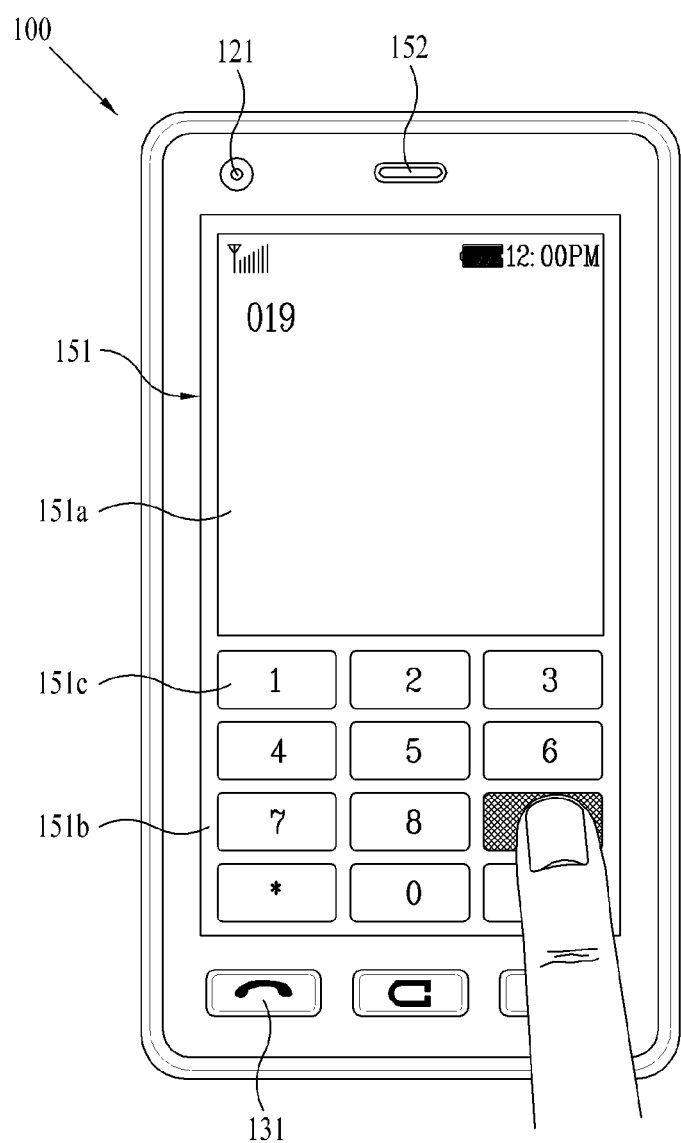
FIG. 2 is front diagram of a mobile terminal according to one embodiment of the present invention for explaining one operational status of the mobile terminal.

FIG. 2 is front-view diagram of a terminal according to one embodiment of the present invention for explaining an operational state thereof.

First of all, various kinds of visual information can be displayed on the display unit 151. And, theses information can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

FIG. 2 shows that a touch applied to a soft key is inputted through a front face of a terminal body.

The display unit 151 is operable through an entire area or by being divided into a plurality of regions. In the latter case, a plurality of the regions can be configured interoperable.

For instance, an output window 151*a* and an input window 151*b* are displayed on the display unit 151. A soft key 151*c* representing a digit for inputting a phone number or the like is outputted to the input window 151*b*. If the soft key 151*c* is touched, a digit corresponding to the touched soft key is outputted to the output window 151*a*. If the first manipulating unit 131 is manipulated, a call connection for the phone number displayed on the output window 151*a* is attempted.

The mobile terminal mentioned in this specification can include at least one of units or modules illustrated in FIG. 1. Also, the mobile terminal can display images by using at least one of a two-dimensional display mode and a three-dimension display mode. Also, the mobile terminal 100 can include a touch screen to perform a display function and a user input function at the same time.

According to the present invention, a three-dimensional (3D) image may be a plane image made through computer graphic software, and a stereoscopic 3D image may be an image (4D image) that can allow a user to feel gradual depth and entity of an object on a monitor or screen at the same level as a real space. Hereinafter, an image displayed three-dimensionally can include both a 3D image and a stereoscopic 3D image.

Also, according to the present invention, examples of the 3D display mode include a stereoscopic mode (or glass mode, generally used for TV for home use), an autostereoscopic mode (or lenticular mode, generally used for mobile terminal), and a projection mode (or holographic mode).

Hereinafter, a method for controlling a three-dimension display of a mobile terminal according to the present invention will be described in detail with reference to the accompanying drawings.

A three-dimension display level mentioned herein may mean a projection level or recess level of an object image when the object image is displayed three-dimensionally. For example, a specific object image can be displayed to be projected or recessed at a certain distance in accordance with a corresponding three-dimension display level. Accordingly, the three-dimension display level can include a three-dimensional projection display level and a three-dimensional recess display level.

In more detail, in a plurality of three-dimension display levels, projection distances or recess distances corresponding to the respective three-dimension display levels may be set differently from one another. For example, a projection distance d may be set in the first three-dimensional projection display level, a projection distance 2d may be set in the second three-dimensional projection display level, and a recess distance −d may be set in the first three-dimensional recess display level.

Figure 3:
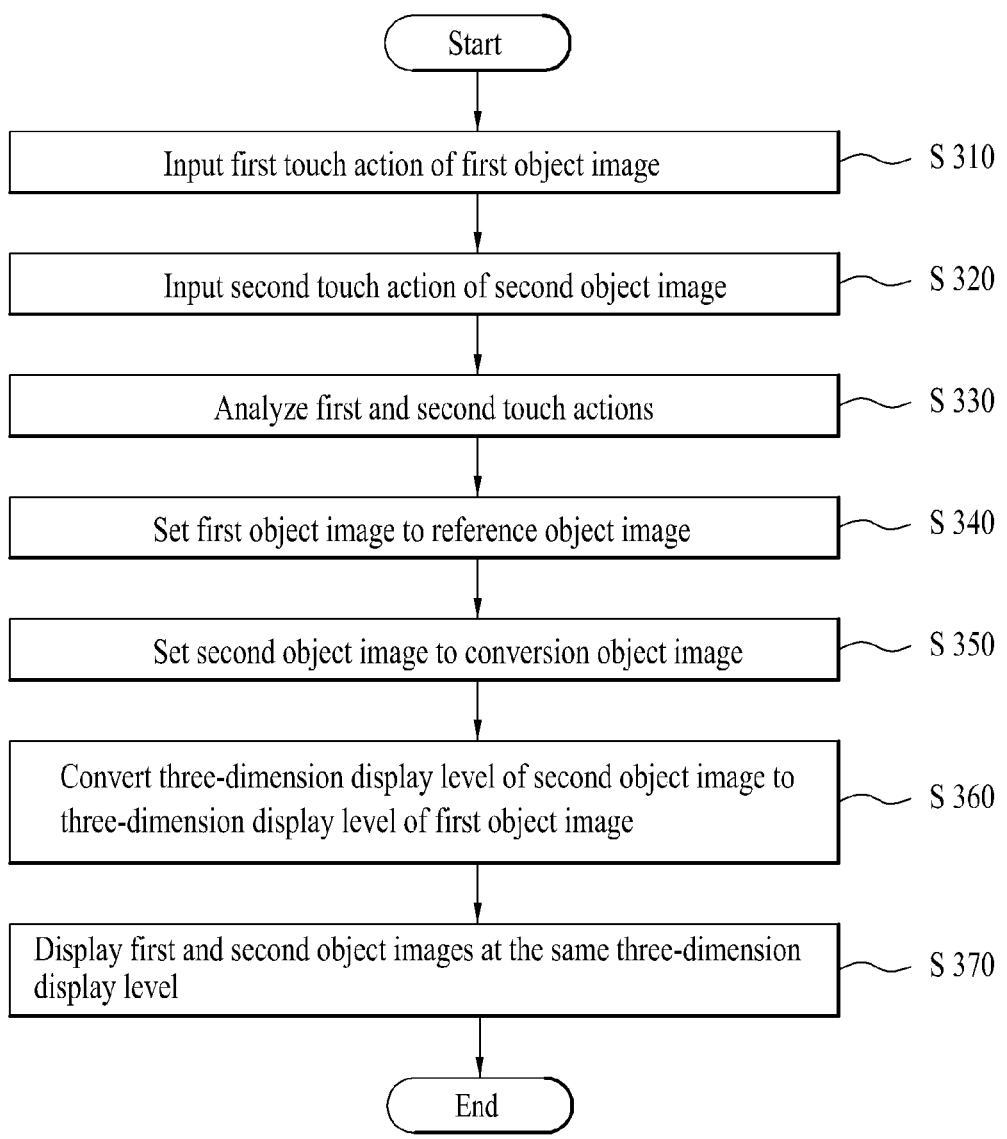
FIG. 3 is a flow chart illustrating a method for controlling a three-dimension display of a mobile terminal according to one embodiment of the present invention.

FIG. 3 is a flow chart illustrating a method for controlling a three-dimension display of a mobile terminal according to one embodiment of the present invention.

As illustrated in FIG. 3, a first selection action of a first object image is input to the mobile terminal 100 (S310), and a second selection action of a second object image is input to the mobile terminal 100 (S320). At this time, the first and second selection actions can be input through the user input unit 130.

The first and second selection actions can include all actions for selecting first and second object images without limitation of input type, including first and second touch actions of each of the first and second object images. In particular, if the first and second selection actions are the first and second touch actions, a touch screen, which is an example of the display unit 151, can be operated as the user input unit 150.

Also, the first and second object images can include a widget image, shortcut image, photo image, drawing image, text image, etc. The first and second object images can be displayed in the form of icon or thumbnail (in case of image).

Also, the first and second object images may be displayed in their display zones, or may be displayed to be overlapped with each other. Also, the first and second object images may be displayed three-dimensionally depending on three-dimension display levels respectively set therein. In more detail, three-dimension display levels having different recess levels or different projection levels may be set in the first and second object images.

In this case, the first and second selection actions may be input at the same time or sequentially. For example, if the selection actions are touch actions, the simultaneous input may be a multi-touch action. The sequential input may be the input of the second touch action within a certain time after the input of the first touch action.

The mobile terminal 100 analyzes the first and second touch actions under the control of the controller 180 (S330).

In the step S330, the mobile terminal 100 can determine at least one of the input order of the first and second selection actions, the input pattern of the first and second selection actions, object attributes of the first and second object images, and whether the first and second object images are photo images or drawing images.

The mobile terminal 100 sets a first object image to a reference object image (S340) and sets a second object image to a conversion object image (S350), in accordance with the analyzed result of the first and second selection actions under the control of the controller 180.

In conversion of the three-dimension display level according to the present invention, the reference object image includes an image which serves as a reference image for conversion, and the conversion object image includes an image which is subjected to conversion.

Hereinafter, setting of the reference object image and the conversion object image based on the analyzed result will be described in more detail. For convenience of description, the selection action will be limited to the touch action.

According to the first case, if the second touch action is continuously input within a certain time after the input of the first touch action, the controller 180 sets the first object image, which is first touched, to the reference object image, and sets the second object image, which is later touched, to the conversion object image.

According to the second case, if the first touch action of one time touch and the second touch action of two times touch are input, the controller 180 sets the first object image, which is touched one time, to the reference object image, and sets the second object image, which is touched two times, to the conversion object image.

According to the third case, if the first touch action for a first time and the second touch action for a second time are input, the controller 180 sets the first object image, which is touched for the first time, to the reference object image, and sets the second object image, which is touched for the second time, to the conversion object image.

According to the fourth case, if the first object image is a graphic image and the second object image is a text image, the controller 180 sets the first object image to the reference object image, and sets the second object image to the conversion object image.

According to the fifth case, if the first object image is a photo image and the second object image is a drawing image, the controller 180 sets the first object image to the reference object image, and sets the second object image to the conversion object image.

As the first and second object images are set to the reference object image and the conversion object image, respectively, the mobile terminal 100 converts the three-dimension display level (hereinafter, referred to as "second three-dimension display level") of the second object image to be identical with the three-dimension display level (hereinafter, referred to as "first three-dimension display level") of the first object image under the control of the controller 180 (S360).

For example, the projection distance of the first three-dimension display level is 2d and the recess distance of the second three-dimension display level is −2d, the controller 180 can convert the second three-dimension display level to have the projection distance of 2d.

In the step S360, the mobile terminal 100 identifies the three-dimension display level of each of the first and second object images, and performs the above converting process if the second three-dimension display level of the second object image is different from the first three-dimension display level. If the three-dimension display levels of the first and second object images are the same as each other, the converting process is not required.

Also, in the step S360, the mobile terminal 100 can gradually convert the second three-dimension display level.

In more detail, the controller 180 can convert the second three-dimension display level to the first three-dimension display level sequentially by dividing the display levels into a plurality of steps without converting the second three-dimension display level to the first three-dimension display level at one time.

For example, supposing that the projection distance of the first three-dimension display level is 2d, the recess distance of the second three-dimension display level is −2d, and the distance per step is d, the controller 180 can convert the second three-dimension display level in the order of "−d, 0, d, and 2d".

Moreover, the mobile terminal 100 can output a notification action by using the output unit 150 under the control of the controller 180, wherein the notification action notifies that the mobile terminal is performing the converting step S360. At this time, the notification action may be stopped by selection of the user.

For example, the mobile terminal 100 may output a vibration, a conversion notification sound, a conversion notification text or image while performing the step S360.

The mobile terminal 100 three-dimensionally displays the first and second object images on the display unit 151 at the same three-dimension display level (corresponding to the aforementioned first three-dimension display level) in accordance with the result of the step S360 under the control of the controller 180 (S370).

In the step S370, the mobile terminal can insert the second object image into the first object image.

For example, the mobile terminal 100 can overlay the second object image on the first object image. At this time, transparency of the second object image may be controlled manually by the user, or may be controlled automatically by the controller 180.

In the step S370, if the first and second object images are displayed to be overlaid on each other before the converting step S360 is performed, the mobile terminal 100 can display the first and second object images in parallel. At this time, the first and second object images can be displayed within their display zones.

In the step S370, if the mobile terminal 100 converts the second three-dimension display level sequentially (or gradually), it can display the second object image to reflect the sequential converting step. Accordingly, the user can identify the sequential converting step of the three-dimension display level of the second object image.

Hereinafter, setting and display of the reference object image and the conversion object image according to the present invention will be described in more detail with reference to the accompanying drawings.

For convenience of description, the first and second selection actions will be limited to the first and second touch actions.

Figure 4C:
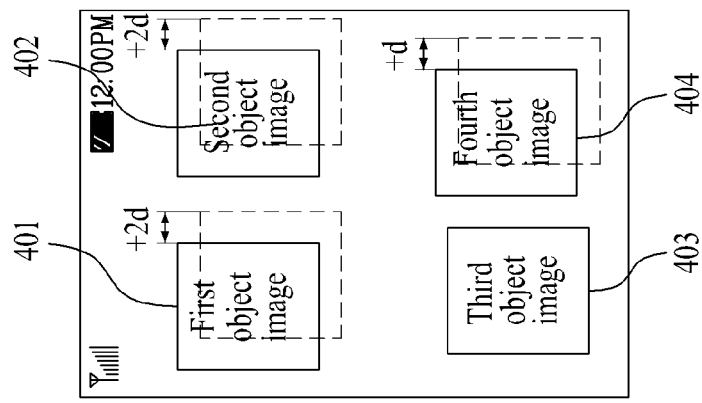
FIG. 4A to FIG. 4C are screen schematic views illustrating that a three-dimension display level of a conversion object image is changed depending on a touch pattern of first and second touch actions in accordance with the present invention.
Figure 4B:
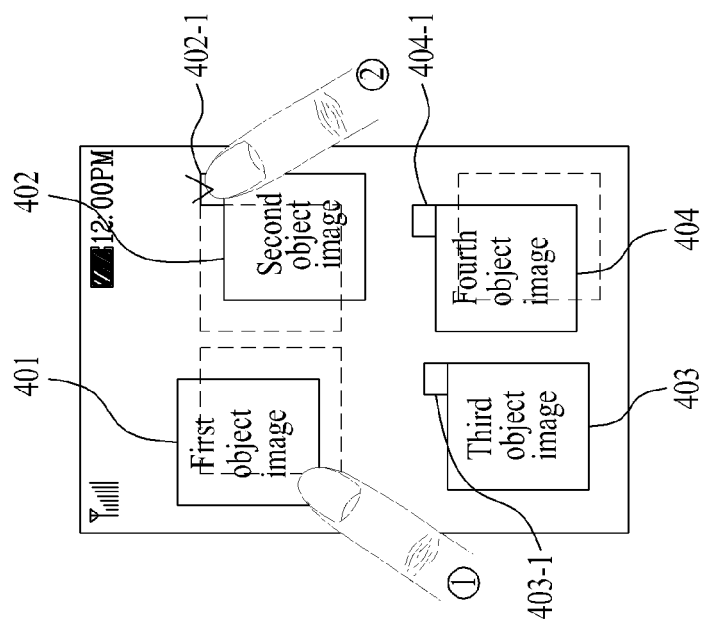
Figure 4A:
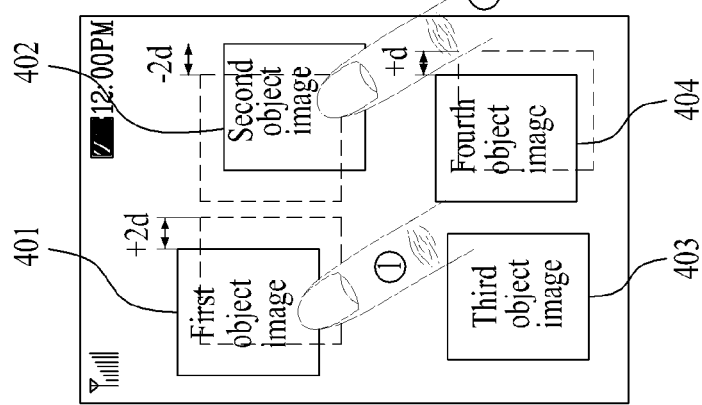

FIG. 4A to FIG. 4C are screen schematic views illustrating that a three-dimension display level of a conversion object image is changed depending on a touch pattern of first and second touch actions in accordance with the present invention.

Referring to FIG. 4A and FIG. 4B, the mobile terminal can three-dimensionally display first to fourth object images 401 to 404 in accordance with the three-dimension display level.

For example, a three-dimension display level of a projection distance of 2d is set in the first object image 401, a three-dimension display level of a recess distance of −2d is set in the second object image 402, a three-dimension display level of a projection distance (or recess distance) of 0 is set in the third object image 403, and a three-dimension display level of a projection distance of 0 is set in the fourth object image 404.

In FIG. 4A, the touch action of the second object image 402 can continuously be input to the mobile terminal 100 within a certain time after the touch action of the first object image 401. Accordingly, the mobile terminal 100 can set the first object image 401, which is first touched, to the reference object image, and can set the second object image 402, which is later touched, to the conversion object image.

Alternatively, in FIG. 4B, if the touch action of the first object image 401 is input to the mobile terminal 100, the mobile terminal 100 can display check boxes 402-1 to 404-1 corresponding to the second to fourth object images 402 to 404, whereby the user can select the check box 402-1 corresponding to the second object image 402. Accordingly, the mobile terminal 100 can set the first object image 401 to the reference object image, and can set the second object image 402 selected through the check box to the conversion object image.

Referring to FIG. 4C, the mobile terminal 100 can convert the three-dimension display level (recess distance of −2d) of the second object image 402 in the same manner as the three-dimension display level (projection distance of 2d) of the first object image 401.

Figure 5A:
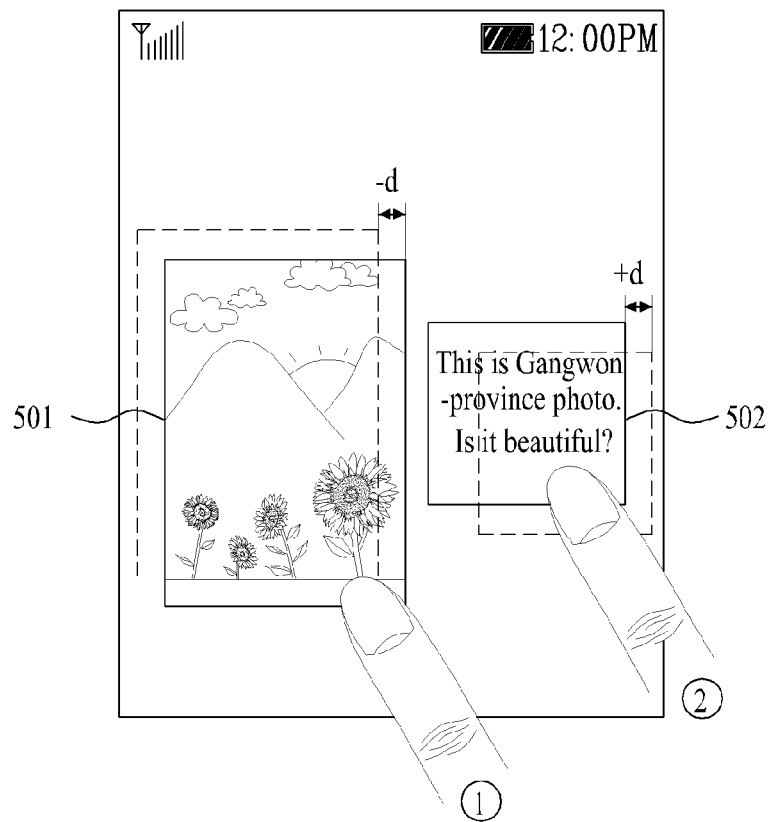
FIG. 5A and FIG. 5B are screen schematic views illustrating that a three-dimension display level of a conversion object image is changed depending on object attributes of first and second object images in accordance with the present invention.
Figure 5B:
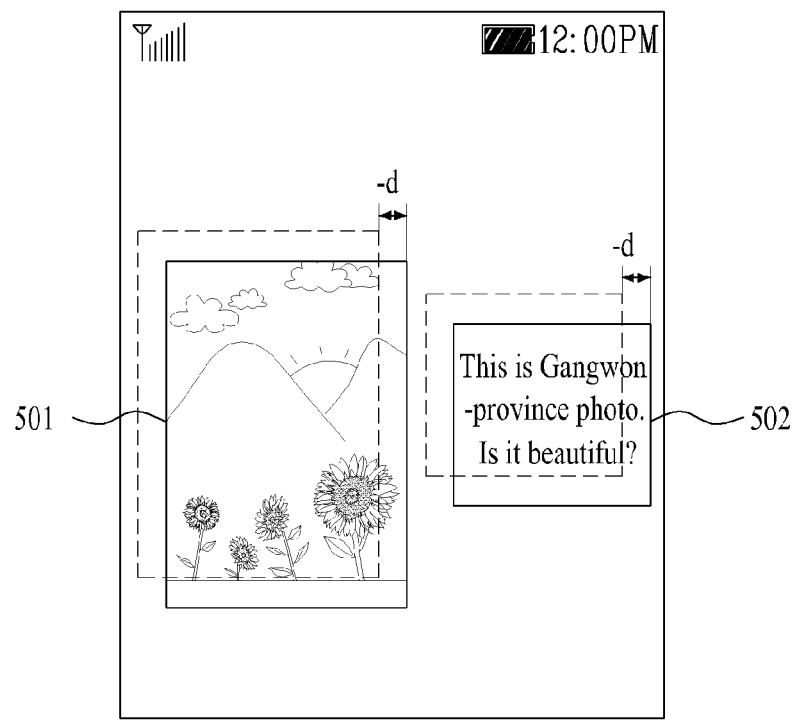

FIG. 5A and FIG. 5B are screen schematic views illustrating that a three-dimension display level of a conversion object image is changed depending on object attributes of first and second object images in accordance with the present invention.

Referring to FIG. 5A, the mobile terminal 100 can three-dimensionally display a first object image 501 and a second object image 502 in accordance with their corresponding three-dimension display levels, wherein the first image 501 is a graphic image and the second object image 502 is a text image.

For example, it is noted that a three-dimension display level of a recess distance of −d is set in the first object image 501, and a three-dimension display level of a projection distance of d is set in the second object image 502.

In FIG. 5A, if the first and second touch actions of the first and second object image 501 and 502 are input to the mobile terminal 100, the mobile terminal 100 can set the first object image 501, which is the graphic image, to the reference object image, and can set the second object image 502, which is the text image, to the conversion object image.

At this time, the reference object image and the conversion object image can be determined depending on object attributes (whether the corresponding object image is graphic image is text image) of the first and second object images regardless of the input order or touch pattern of the first and second touch actions.

Referring to FIG. 5B, the mobile terminal 100 can convert the three-dimension display level (projection distance of d) of the second object image 502 in the same manner as the three-dimension display level (recess distance of −d) of the first object image 501.

Figure 6A:
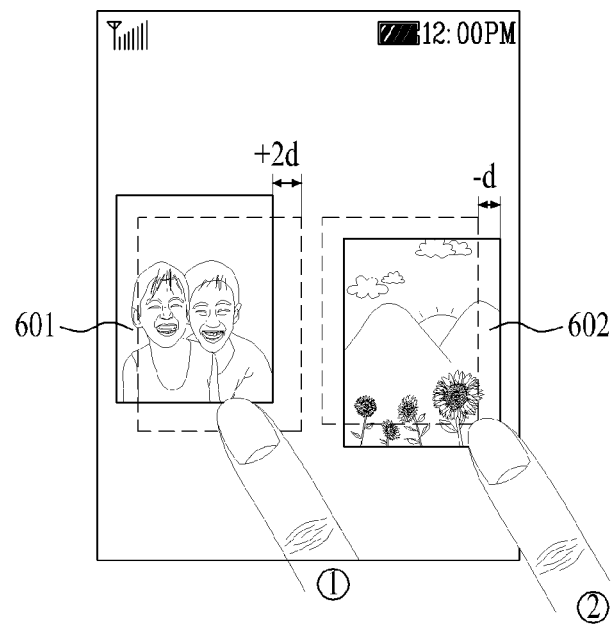
FIG. 6A and FIG. 6B are screen schematic views illustrating that a three-dimension display level of a conversion object image is changed depending on whether first and second object images are photo images or drawing images in accordance with the present invention.
Figure 6B:
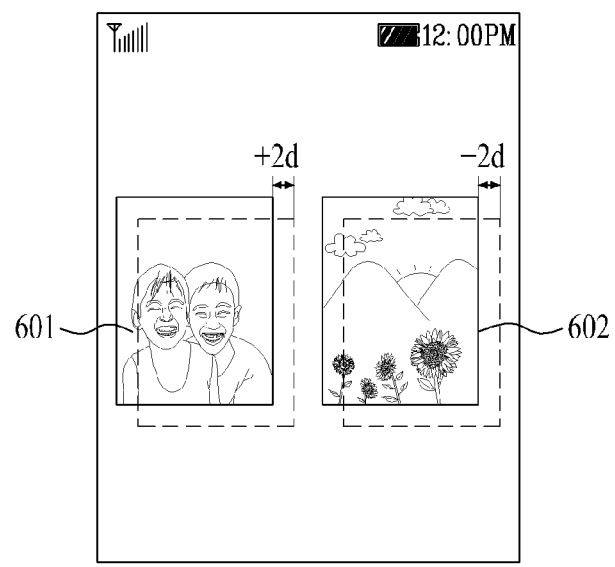

FIG. 6A and FIG. 6B are screen schematic views illustrating that a three-dimension display level of a conversion object image is changed depending on whether first and second object images are photo images or drawing images in accordance with the present invention.

Referring to FIG. 6A, the mobile terminal 100 can three-dimensionally display a first object image 601 and a second object image 602 in accordance with their corresponding three-dimension display levels, wherein the first image 601 is a photo image and the second object image 602 is a drawing image.

For example, it is noted that a three-dimension display level of a projection distance of 2d is set in the first object image 601, and a three-dimension display level of a recess distance of −d is set in the second object image 602.

In FIG. 6A, if the first and second touch actions of the first and second object image 601 and 602 are input to the mobile terminal 100, the mobile terminal 100 can set the first object image 601, which is the photo image, to the reference object image, and can set the second object image 602, which is the drawing image, to the conversion object image.

Referring to FIG. 6B, the mobile terminal 100 can convert the three-dimension display level (recess distance of −d) of the second object image 602 in the same manner as the three-dimension display level (projection distance of 2d) of the first object image 601.

FIG. 7A to FIG. 7D are screen schematic views illustrating that a process of changing a three-dimension display level of a conversion object image is gradually displayed in accordance with the present invention.

Figure 7A:
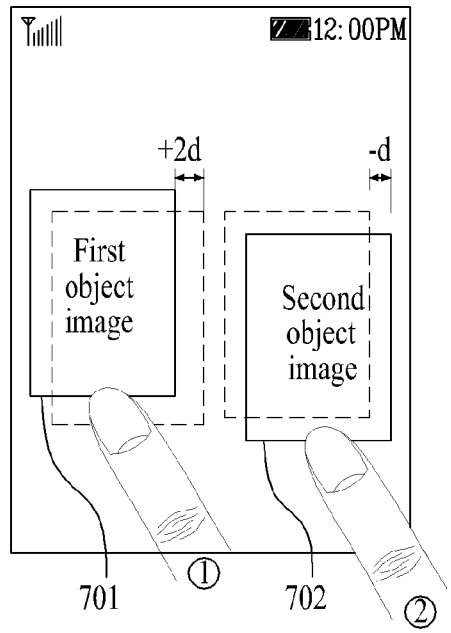
FIG. 7A to FIG. 7D are screen schematic views illustrating that a process of changing a three-dimension display level of a conversion object image is gradually displayed in accordance with the present invention.

Referring to FIG. 7A, the mobile terminal 100 can three-dimensionally display a first object image 701 and a second object image 702 in accordance with their corresponding three-dimension display levels.

For example, it is noted that a three-dimension display level of a projection distance of 2d is set in the first object image 701, and a three-dimension display level of a recess distance of −d is set in the second object image 702.

In FIG. 7A, if the first and second touch actions of the first and second object image 701 and 702 are input to the mobile terminal 100, the mobile terminal 100 can set the first object image 701 to the reference object image, and can set the second object image 702 to the conversion object image.

Figure 7B:
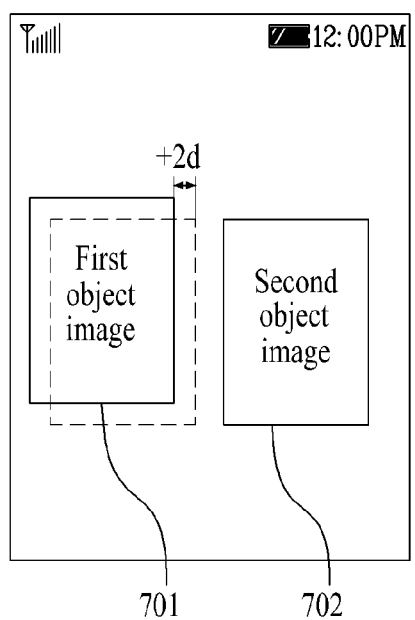
Figure 7C:
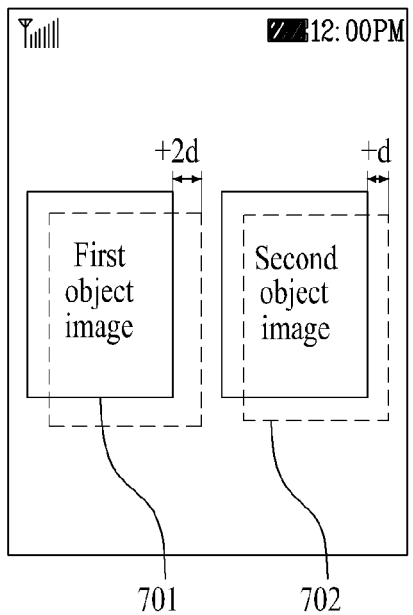
Figure 7D:
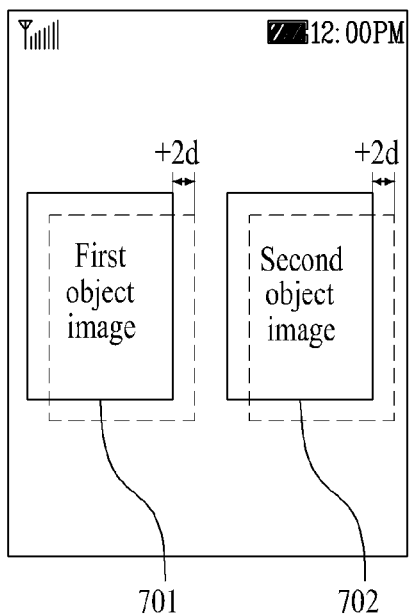

Referring to FIG. 7B to FIG. 7D, the mobile terminal 100 can sequentially convert the three-dimension display level (recess distance of −d) of the second object image 702 to be identical with the three-dimension display level (projection distance of 2d) of the first object image 701.

For example, the mobile terminal 100 can sequentially convert the three-dimension display level of the second object image 702 in the order of projection distance of −d (start), projection distance of 0, projection distance of d, and projection distance of 2d (end). Accordingly, the user can identify the sequential converting process of the three-dimension display level of the second object image 702.

Figure 8A:
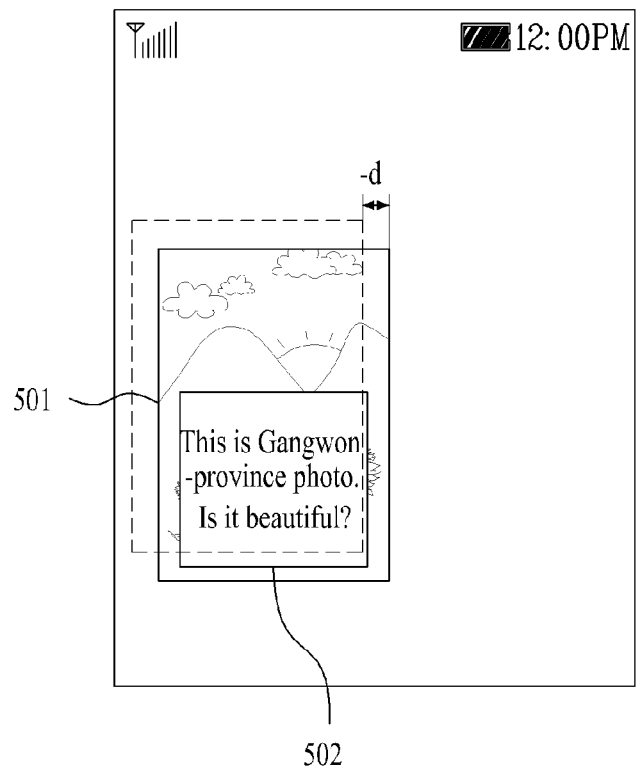
FIG. 8A and FIG. 8B are screen schematic views illustrating that a conversion object image inserted into a reference object image is displayed in accordance with the present invention.
Figure 8B:
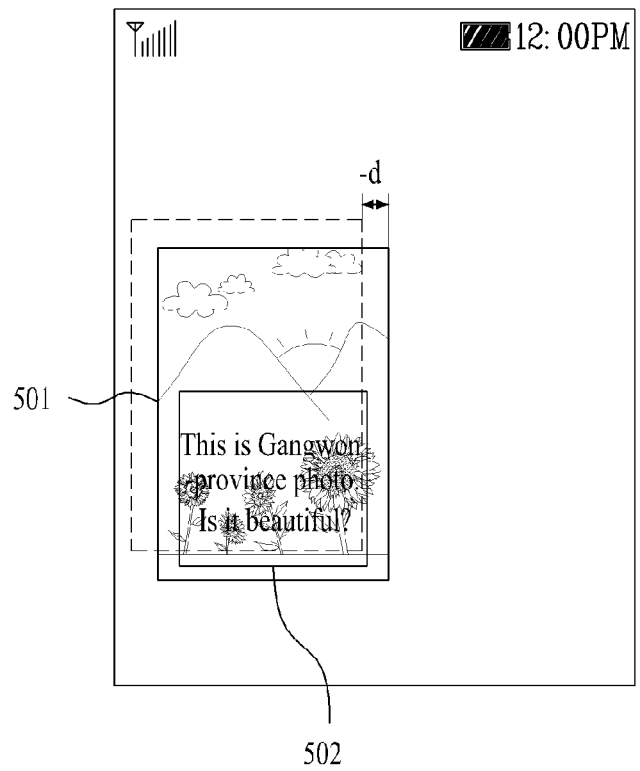

FIG. 8A and FIG. 8B are screen schematic views illustrating that a conversion object image inserted into a reference object image is displayed in accordance with the present invention.

Referring to FIG. 5B, the mobile terminal 100 can set the same three-dimension display level (recess distance of −d) as that of the first object image 501, which is the graphic image, in the second object image 502 which is the text image.

Referring to FIG. 8A and FIG. 8B, the mobile terminal 100 can overlay-display the second object image 502, which is the text image, on the first object image 501 which is the graphic image. At this time, transparency of the second object image 502 can be controlled.

In more detail, the second object image 502 may be displayed opaquely (FIG. 8A), or may be displayed transparently (FIG. 8B).

FIG. 9A to FIG. 10B are screen schematic views illustrating that a reference object image and a conversion object image are displayed in parallel in accordance with the present invention.

First of all, FIG. 9A and FIG. 9B will be described.

Figure 9A:
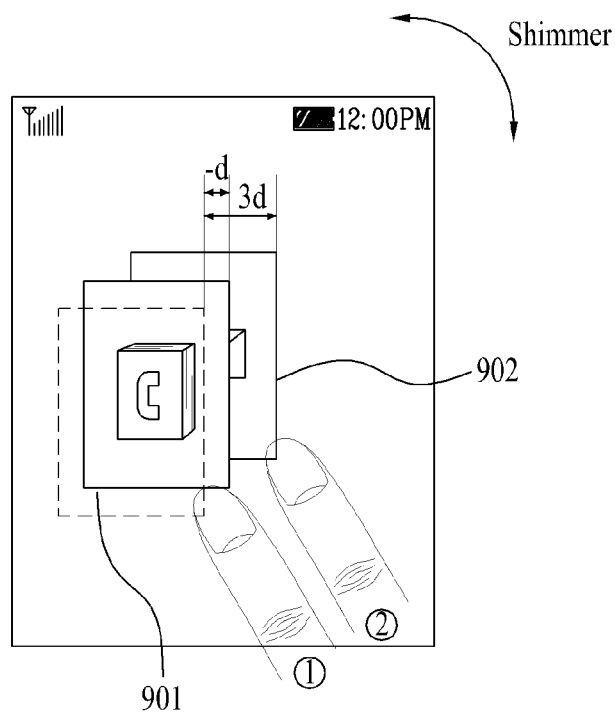
FIG. 9A to FIG. 10B are screen schematic views illustrating that a reference object image and a conversion object image are displayed in parallel in accordance with the present invention.

Referring to FIG. 9A, the mobile terminal 100 can three-dimensionally display a first object image 901 (recess distance of −d) and a second object image 902 (recess distance of −3d) to be overlaid on each other, wherein a three-dimension display level set in the first object image 901 is different from that set in the second object image 902.

In FIG. 9A, if the first and second touch actions of the first and second object image 901 and 902 are input to the mobile terminal 100, the mobile terminal 100 can set the first object image 901 to the reference object image, and can set the second object image 902 to the conversion object image.

In the meantime, the mobile terminal 100 may set the object image located at the front or object image located at the rear to the reference object image and the other object image to the conversion object image regardless of the input order of the first and second touch actions.

Figure 9B:
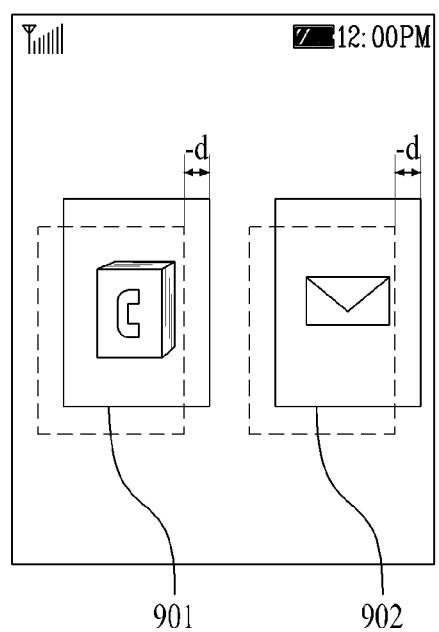

Referring to FIG. 9B, the mobile terminal 100 can display the first and second object images 901 and 902 in parallel, wherein the three-dimension display level of the second object image 902 is identical with the three-dimension display level (recess distance of –d) of the first object image 901.

Next, FIG. 10A and FIG. 10B will be described.

Figure 10A:
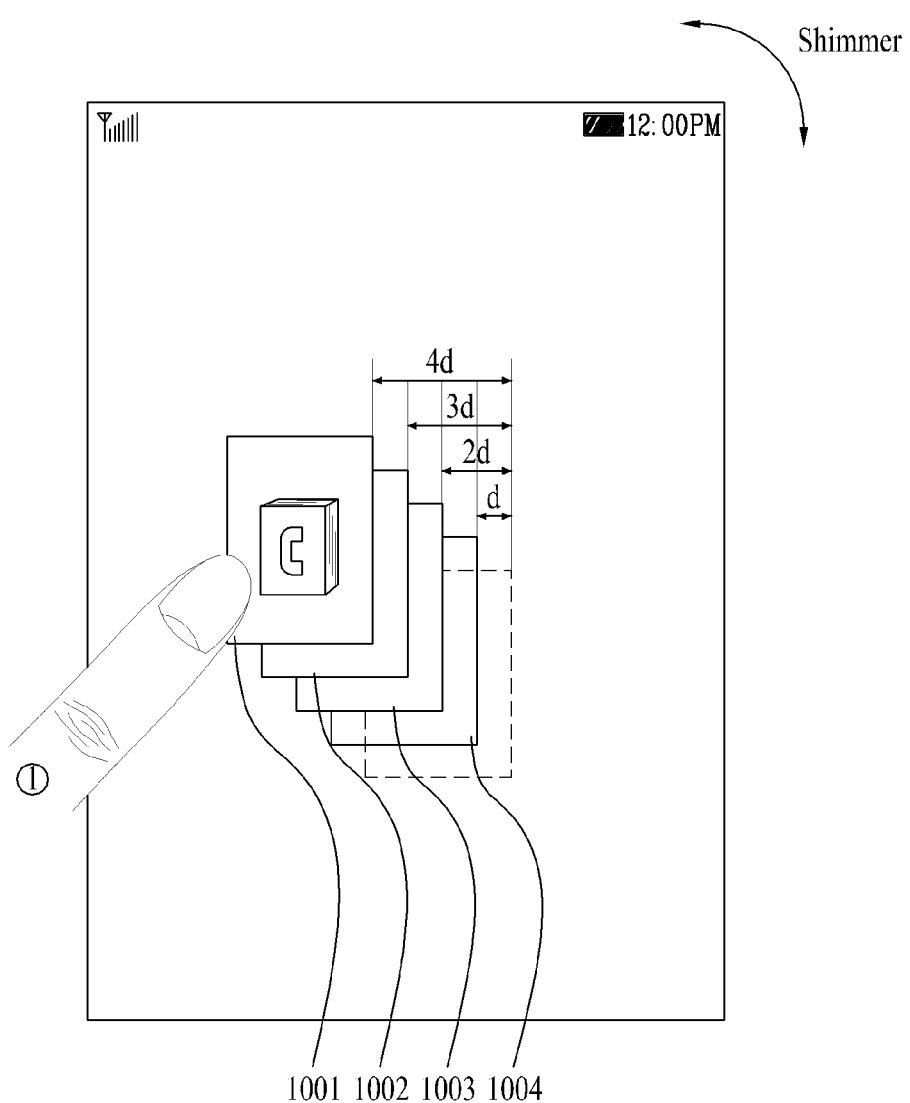

Referring to FIG. 10A, the mobile terminal 100 can three-dimensionally display first to fourth object images 1001 to 1004 to be overlaid on one another, wherein three-dimension display levels set in the first to fourth object images 1001 to 1004 are different from one another.

In FIG. 10A, if the touch action of the first object image 1001 is input to the mobile terminal 100, the mobile terminal 100 can set the first object image 1001 to the reference object image, and can set the other object images 1002 to 1004 to the conversion object images.

In the mean time, if the first touch action of any one of the first to fourth object images 1001 to 1004 and the second touch action of the other object images are input to the mobile terminal 100, the mobile terminal 100 may set the one object image to the reference object image and the other object images to the conversion object images.

Figure 10B:
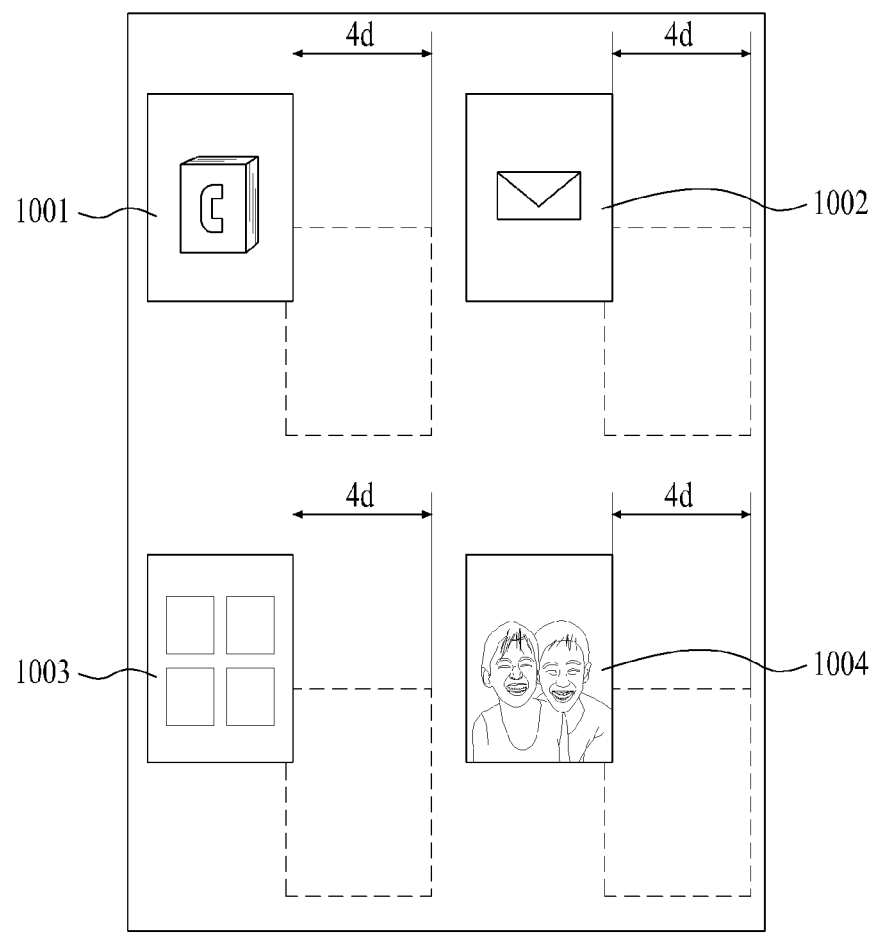

Referring to FIG. 10B, the mobile terminal 100 can display the first to fourth object images 1001 to 1004 in parallel, wherein the three-dimension display levels of the second to fourth object images 1002 to 1004 are identical with the three-dimension display level (projection distance of 4d) of the first object image 1001.

As the plurality of object images overlaid are displayed in parallel in FIG. 9B or FIG. 10B, if the display zone is not sufficient, the controller 180 can reduce the size of each of the plurality of object images.

Also, instead of the touch action, the shimmer action of the mobile terminal may be input in FIG. 9A or FIG. 10A. If the shimmer action of the mobile terminal is input, the object image located at the front may be the reference object image, and the other object image(s) located at the front may be the conversion object image(s).

For example, the controller 180 may reduce only the size of the conversion object image except for the reference object image, or may reduce the reference object image and the conversion reference image at the same rate.

According to the present invention, in a state that the mobile terminal 100 selects the first object image as the reference object image in accordance with the first selection action, a text/image adding command may be input from the user to the mobile terminal 100. At this time, if the mobile terminal 100 currently displays the first object image only as the image that can be selected as the reference object image (for example, if the first object image is displayed on the entire screen), it can select the first object image as the reference object image without any separate selection action.

If the text/image adding command is input to the mobile terminal 100, the mobile terminal 100 can display the three-dimensional input zone (or three-dimensional input window or three-dimensional input box) on the screen under the control of the controller 180, wherein the same three-dimension display level as that of the first object image is set in the three-dimensional input zone.

In this case, the text/image adding command may be input by selection of a corresponding key button, a corresponding key zone or a corresponding menu item.

Also, if the text or image to be displayed in the three-dimensional input zone is input from the user to the mobile terminal 100, the mobile terminal 100 can display the input text or image in the three-dimensional input zone. At this time, the input text or image can three-dimensionally be displayed in accordance with the three-dimension display level set in the three-dimensional input zone. Also, the input text or image may be input directly by the user, or may previously be stored in the memory 160.

At this time, the user can select (or touch) a desired point of the screen, in which the three-dimensional space will be arranged, and the mobile terminal 100 can arrange the three-dimensional input zone in the selected point by recognizing a position value of the selected point.

This will be described in more detail with reference to FIG. 11A to FIG. 11C.

Figure 11A:
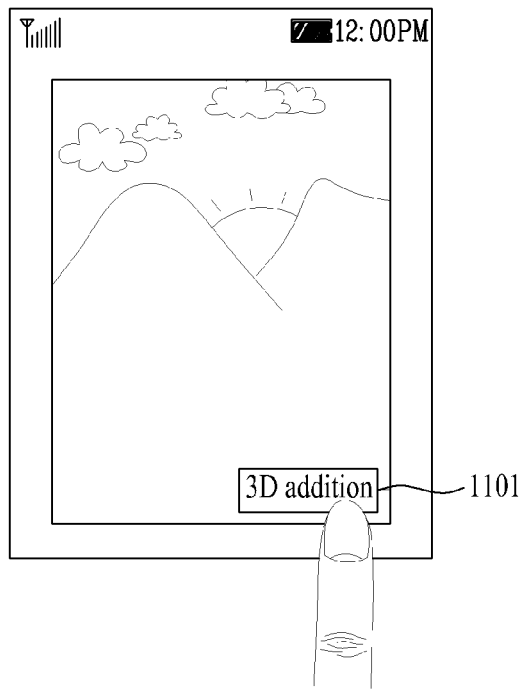
FIG. 11A to FIG. 11C are screen schematic views illustrating that a three-dimensional input zone is displayed within a reference object image in accordance with the present invention.

Referring to FIG. 11A, in a state that the mobile terminal 100 displays the first object image, a 3D additional key zone 1101 provided on the screen may be selected from the user.

Figure 11B:
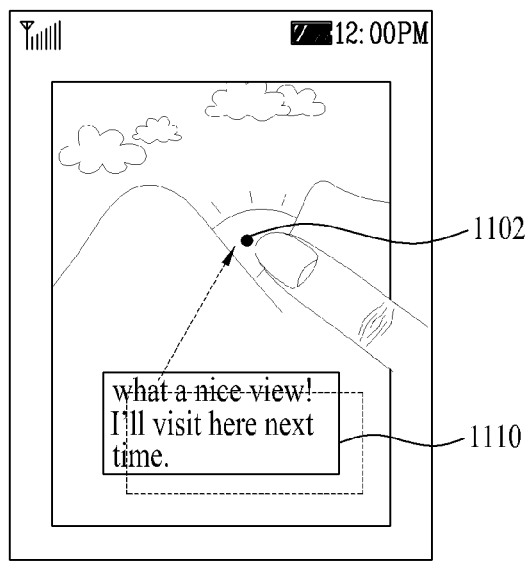

Referring to FIG. 11B, as the 3D additional key zone 1101 is selected, the mobile terminal 100 can display a three-dimensional input zone 1110 in a random point of the screen, and can display the text (or image) input from the user in the three-dimensional input zone 1110.

Figure 11C:
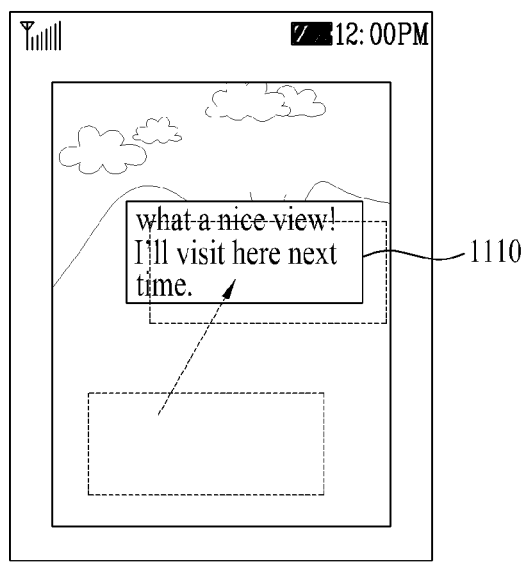

Referring to FIG. 11C, if a specific point 1102 is selected in FIG. 11B, the mobile terminal 100 can display the three-dimensional input zone 1110 by moving it to the specific point 1102. At this time, the specific point 1102 can be selected by a touch action of the specific point 1102 or a touch drag action from one point within the three-dimensional input zone 1110 displayed in the random point from the specific point 1102.

According to one embodiment of the present invention, the above-described 3 dimension display controlling methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The mobile terminal according to at least one embodiment of the present invention configured as above and the method for controlling three-dimension display thereof have the following advantages.

First of all, the three-dimension display level of one object image can simply be converted based on the other object image in a state that a plurality of object images are displayed.

In addition, since the three-dimension display level of one object image can be converted based on the other object image in a state that a plurality of object images are displayed, the user does not need to directly input the three-dimension display level to be converted.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

First of all, the three-dimension display level of one object image can simply be converted based on the other object image in a state that a plurality of object images are displayed.

In addition, since the three-dimension display level of one object image can be converted based on the other object image in a state that a plurality of object images are displayed, the user does not need to directly input the three-dimension display level to be converted.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Thus, the present invention solves the problem in the related art mobile terminal in that the user does not have to directly select a menu list corresponding to three-dimension display level change.

That is, the user does not have to set a state for changing a three-dimension display level of a specific object image by directly selecting a corresponding menu list when he/she desires to change the three-dimension display level.

Accordingly, the user can simply change the three-dimension display level in a state that the object image is displayed.

What is claimed is:

1. A mobile terminal, comprising:
   a display unit configured to display at least a first 3D object at a first 3D depth level and a second 3D object at a second 3D depth level that is different than the first 3D depth level; and
   a controller configured to receive a first selection action on the first 3D object and a second selection action on the second 3D object image, to convert the second 3D depth level of the second 3D object to match the first 3D depth level of the first 3D object based on the first and second selection actions, and to control the display unit to display the first and second 3D objects at the first 3D depth level.

2. The mobile terminal of claim 1, wherein the first and second selection actions are received at a same time or are sequentially received.

3. The mobile terminal of claim 1, wherein the first and second 3D depth levels include at least one of a positive three-dimensional display level and a negative three-dimensional display level.

4. The mobile terminal of claim 1, wherein the controller is further configured to set the first 3D object as a reference object and the second 3D object as a conversion object to be converted to the same 3D depth level as the first 3D object based on at least one of an input order of the first and second selection actions, an input pattern of the first and second selection actions, object attributes of the first and second 3D objects, and whether the first and second 3D objects are photo images or drawing images.

5. The mobile terminal of claim 1, wherein the controller is further configured to gradually convert the second 3D depth level of the second 3D object to match the first 3D depth level of the first 3D object in predetermined depth level increments, and to control the display unit to display the second 3D object as gradually being converted from the second 3D depth level to the first 3D depth level.

6. The mobile terminal of claim 1, wherein the controller is further configured to control the display unit to insert the second 3D object into the first 3D object when converting the second 3D depth level of the second 3D object into the first 3D depth level.

7. The mobile terminal of claim 6, wherein the controller is further configured to control the display unit to overlay the second 3D object onto the first 3D object when converting the second 3D depth level of the second 3D object into the first 3D depth level.

8. The mobile terminal of claim 7, wherein the controller is further configured to change a transparency of the second 3D object when the second 3D object is overlaid onto the first 3D object.

9. The mobile terminal of claim 1, wherein when the first and second 3D objects appear overlaid, the controller is further configured to control the display unit to display the second 3D object and the first 3D object as being substantially parallel when viewed, when converting the second 3D depth level of the second 3D object into the first 3D depth level.

10. The mobile terminal of claim 1, further comprising:
    an output unit configured to output a notification action notifying that the conversion of the second 3D depth level of the second 3D object is being converted into the first 3D depth level of the first 3D object.

11. A method of controlling a mobile terminal, the method comprising:
    displaying, via a display unit on the mobile terminal, at least a first 3D object at a first 3D depth level and a second 3D object at a second 3D depth level that is different than the first 3D depth level; and
    receiving, via a controller on the mobile terminal, a first selection action on the first 3D object and a second selection action on the second 3D object image;
    converting, via the controller, the second 3D depth level of the second 3D object to match the first 3D depth level of the first 3D object based on the first and second selection actions; and
    displaying, via the display unit, the first and second 3D objects at the first 3D depth level.

12. The method of claim 11, wherein the first and second selection actions are received at a same time or are sequentially received.

13. The method of claim 11, wherein the first and second 3D depth levels include at least one of a positive three-dimensional display level and a negative three-dimensional display level.

14. The method of claim 11, wherein the converting step further comprises:
    setting the first 3D object as a reference object and the second 3D object as a conversion object to be converted to the same 3D depth level as the first 3D object based on at least one of an input order of the first and second selection actions, an input pattern of the first and second selection actions, object attributes of the first and second 3D objects, and whether the first and second 3D objects are photo images or drawing images.

15. The method of claim 11, further comprising:
    gradually converting the second 3D depth level of the second 3D object to match the first 3D depth level of the first 3D object in predetermined depth level increments; and
    displaying the second 3D object as gradually being converted from the second 3D depth level to the first 3D depth level on the display unit.

16. The method of claim 11, further comprising:
  inserting the second 3D object into the first 3D object when converting the second 3D depth level of the second 3D object into the first 3D depth level.

17. The method of claim 16, wherein the converting step further comprises:
  overlaying the second 3D object onto the first 3D object on the display unit when converting the second 3D depth level of the second 3D object into the first 3D depth level.

18. The method of claim 17, wherein the converting step further comprises:
  changing a transparency of the second 3D object when the second 3D object is overlaid onto the first 3D object.

19. The method of claim 11, wherein when the first and second 3D objects appear overlaid, the method further comprises:
  displaying the second 3D object and the first 3D object as being substantially parallel when viewed, when converting the second 3D depth level of the second 3D object into the first 3D depth level.

20. The method of claim 11, further comprising:
  outputting, via an output unit, a notification action notifying that the conversion of the second 3D depth level of the second 3D object is being converted into the first 3D depth level of the first 3D object.

* * * * *